United States Patent [19]

Shafar

[11] 4,223,980
[45] Sep. 23, 1980

[54] SAFETY REFLECTOR FOR FREIGHT CARS

[76] Inventor: Bernard A. Shafar, 152 Vermont, LaSalle, Ont., Canada, N9J 1C9

[21] Appl. No.: 938,709

[22] Filed: Aug. 31, 1978

[51] Int. Cl.² .............................................. G02B 5/12
[52] U.S. Cl. ..................................... 350/97; 350/102; 246/473 R
[58] Field of Search ................................. 350/97–105; 246/473 R, 474, 174, 167, 125, 208, 312; 40/415, 125, 219, 583; 116/63, 244; 151/63; 85/65, 80, 73, 38, 23, 20, DIG. 1, 180; 273/180

[56] References Cited

U.S. PATENT DOCUMENTS

| 784,750 | 3/1905 | Morgan | 246/474 |
|---|---|---|---|
| 2,040,317 | 5/1936 | Larson | 40/583 |
| 2,502,267 | 3/1950 | McPherson | 85/23 |
| 2,551,831 | 5/1951 | Eaves | 40/611 |
| 2,701,540 | 2/1955 | Hamilton | 350/99 |
| 3,525,088 | 8/1970 | Thummel | 350/97 |
| 3,678,535 | 7/1972 | Charles | 85/73 |
| 3,739,684 | 6/1973 | Vitkevich | 85/73 |
| 3,919,916 | 11/1975 | Alexander | 85/23 |
| 4,047,798 | 9/1977 | Bennet | 116/28 R |
| 4,108,406 | 8/1978 | Williams | 350/97 |
| 4,121,851 | 10/1978 | Finkenbiner | 350/99 |

Primary Examiner—John K. Corbin
Assistant Examiner—B. Wm. de los Reyes
Attorney, Agent, or Firm—Charles Krassov

[57] ABSTRACT

This invention consists of a light reflecting sign for attachment to railway cars for the prevention of accidents when such cars are stalled or parked across minor, poorly lit country roads. It is in the shape of a horizontal "X" resembling a "railway crossing" sign the face of which is lined primarily with red flat plastic light-reflecting strips which are tipped at the ends of the sign with small yellow angular surface reflectors.

2 Claims, 6 Drawing Figures

U.S. Patent Sep. 23, 1980 4,223,980

SAFETY REFLECTOR FOR FREIGHT CARS

This invention consists of a warning sign, in the form of a light reflector which is attachable to one or both walls of a freight car.

Quite often, and for various reasons which cannot be avoided, a single freight car or a train of such freight cars are stopped, for a long or short period of time, across a minor highway or country road which is not provided with ringing or flashing signals or street lights. This creates a serious hazzard to vehicles traveling on such roads, during the night or other periods of poor visibility. Many accidents or near accidents have been recorded because of this situation.

The object of this invention is to provide a means for preventing such accidents.

Since the above described condition creates the greatest amount of danger to fast traveling vehicles, such as cars or trucks, safety means can be provided by this invention, being a suitable light reflecting device which can be activated and seen from a considerable distance, by the headlights of the approaching vehicle.

Figure 1:
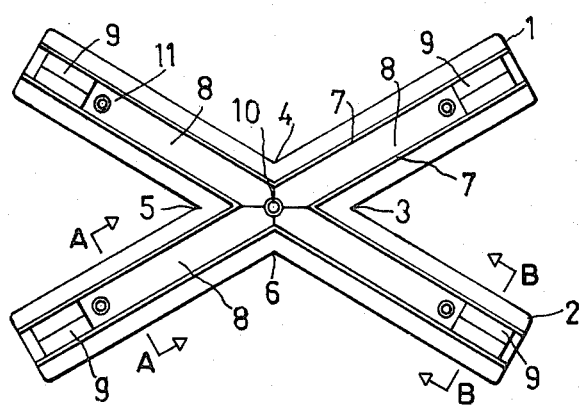
Figure 2:
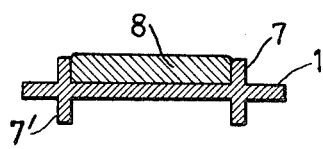
Figure 3:
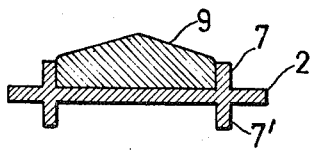
Figure 4:
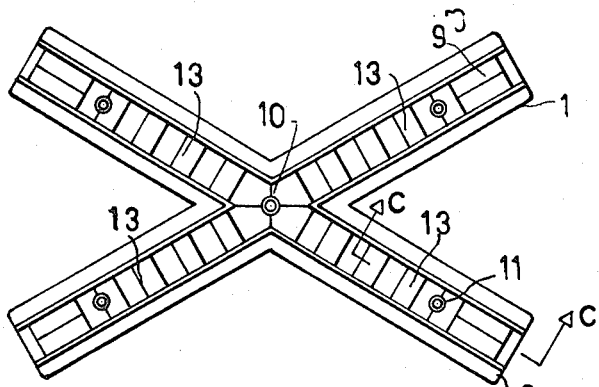
Figure 5:
Figure 6:
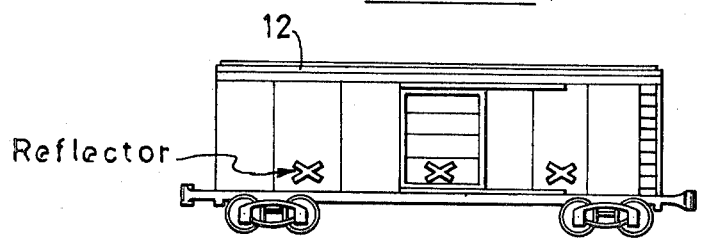

In describing the invention reference will be made to the attached drawings in which, FIG. 1, is a front view of the invention, FIG. 2, is section A—A of FIG. 1, FIG. 3, is section B—B of FIG. 1, FIG. 4, shows a front view of a variation in the invention, FIG. 5, is section C—C of FIG. 4, and FIG. 6, shows the way the invention is preferably attached to a freight or box car.

The invention which is a light reflecting sign, is shown consisting of two elongated rectangular bars 1 and 2 which cross each other at their centers, at an angle about 60°; similar to the standard railway crossing sign used on highways approaching railway tracks. The outlines of the crossing bars 1 and 2 are omitted at the center of the sign where they cross, since the sign consists of a single moulded unit, so that the outline of the entire sign consists of the outline of said bars terminating at the corners 3,4,5, and 6, where they meet. Inside the face of the sign are centrally located, spaced, raised, and parallel tracks 7, which contain flat sheets of plastic, light-reflecting sheets 8, which are red in color.

These sheets 8, start a short distance from each end of the sign and terminate at the center of the sign where their ends abut each other. Abuting the outer ends of the sheet 8, and filling a space at the end of each arm 1 and 2 is inserted a yellow colored, short angular surfaced plastic reflector 9.

A preferred method of attaching the sheets 8 to the said arms consists of rivetting their pointed ends with a single rivet 10 at the center of the sign, and rivetting their other ends with hollow tubular and flared rivets 11. Each of the rivets 11 will then provide a means of attaching the invention to the faces of the box car 12, by inserting screws in the hollow rivets. A set of tracks 7' corresponding to the tracks 7 is provided directly below the tracks 7, on the underside of the sign to reinforce and stiffen the sign.

In FIGS. 4 and 5 is shown a variation in the construction of the invention. In this case, the red flat plates 8, are replaced by a series of short reflector 13 which abut each other. The reflector 13, is similar to the reflector 9 in that it consists of a prism having a flat bottom, and vertical flat sides. The surface comes to a raised central peak so that two sloping faces are formed to reflect light coming in at an angle.

A preferred method of attaching the various components to each other has been described. However, various methods of plastic gluing can be used, particularly in the case of the variation shown in FIGS. 4 and 5.

In FIG. 6, a suggested method of locating the reflectors on the walls of a box car 12, are shown. These can be attached permanently to the car or they may be made easily removable and replaceable.

Having described my invention, what I claim is:

1. In combination, a railway freight car, a safety light-reflecting device attached to a side of said freight car and comprising a sign having a shape of an "X" in a horizontal position resembling a standard railway crossing warning sign, said sign comprising two elongate rectangular bars which cross each other at their centers, said bars having front, spaced, raised parallel tracks, reflecting material located in and filling the space between said front tracks, said reflecting material extending from a short distance away from the ends of the bars to the center of the intersection thereof, additional reflecting means between the front tracks at the outer ends of said bars beyond said reflecting material, and abutting the ends of the reflecting material, single rivet means at the intersecting ends of said reflecting material and affixing all four of the ends to said bars, hollow rivet means near the outer ends of each said bars and extending through said bars and affixing outer end portions of said reflecting material to said bars, said hollow rivet means having bores extending completely therethrough from one end to the other for receiving fastener means extending therethrough for affixing said sign to the side of the freight car.

2. The combination according to claim 1 characterized by said reflecting material comprising a plurality of abutting colored retangular prisms, each having a centrally raised ridge with two downwardly sloping sides extending from the ridge, said ridges being at right angles to the longitudinal extent of said bars.

* * * * *